June 2, 1959 W. A. PAULSON 2,889,536

FREQUENCY RESPONSIVE RECEIVER FOR REMOTE CONTROL SYSTEM

Filed Jan. 24, 1956

INVENTOR.
William A. Paulson
BY
Carlson, Pitzner, Hubbard & Wolfe
ATTORNEYS 2,889,536

FREQUENCY RESPONSIVE RECEIVER FOR REMOTE CONTROL SYSTEM

William A. Paulson, Rockford, Ill., assignor to Barber-Colman Company, Rockford, Ill., a corporation of Illinois Application January 24, 1956, Serial No. 560,931
7 Claims. (Cl. 340—164)

This invention relates generally to a receiver for performing a control function selectively in response to a code combination of signal pulses of different frequencies transmitted from a remote control point. More particularly, the invention relates to a receiver having a stepping mechanism which is advanced unidirectionally a predetermined distance to perform the control function upon receipt of the correct combination of the code signal pulses.

A general object of the invention is to provide a novel frequency responsive receiver which is reliable and accurate in its operation, which discriminates in a novel manner against combinations of signal pulses other than the preselected code combination and which may be adjusted easily to respond to different combinations of signal pulses.

Another object is to provide a frequency responsive receiver whose sensitivity to the different signal frequencies is varied in a novel manner during receipt of the preselected code combination to effect advance of the stepping mechanism in response to each correct pulse and to prevent such advance upon receipt of an incorrect pulse.

A more detailed object is to control advance of the stepping mechanism by a frequency responsive discriminator whose sensitivity to the different signal frequencies is varied by the mechanism for advance of the latter only upon receipt of the correct code combination.

The invention also resides in the novel manner of limiting the period of response by the receiver and restoring the stepping mechanism to a starting position for a new cycle without performing the control function when the code combination is not received within such period.

Other objects and advantages of the invention will become apparent from the following detailed description taken in connection with the accompanying drawings, in which.

Figures 1, 2:
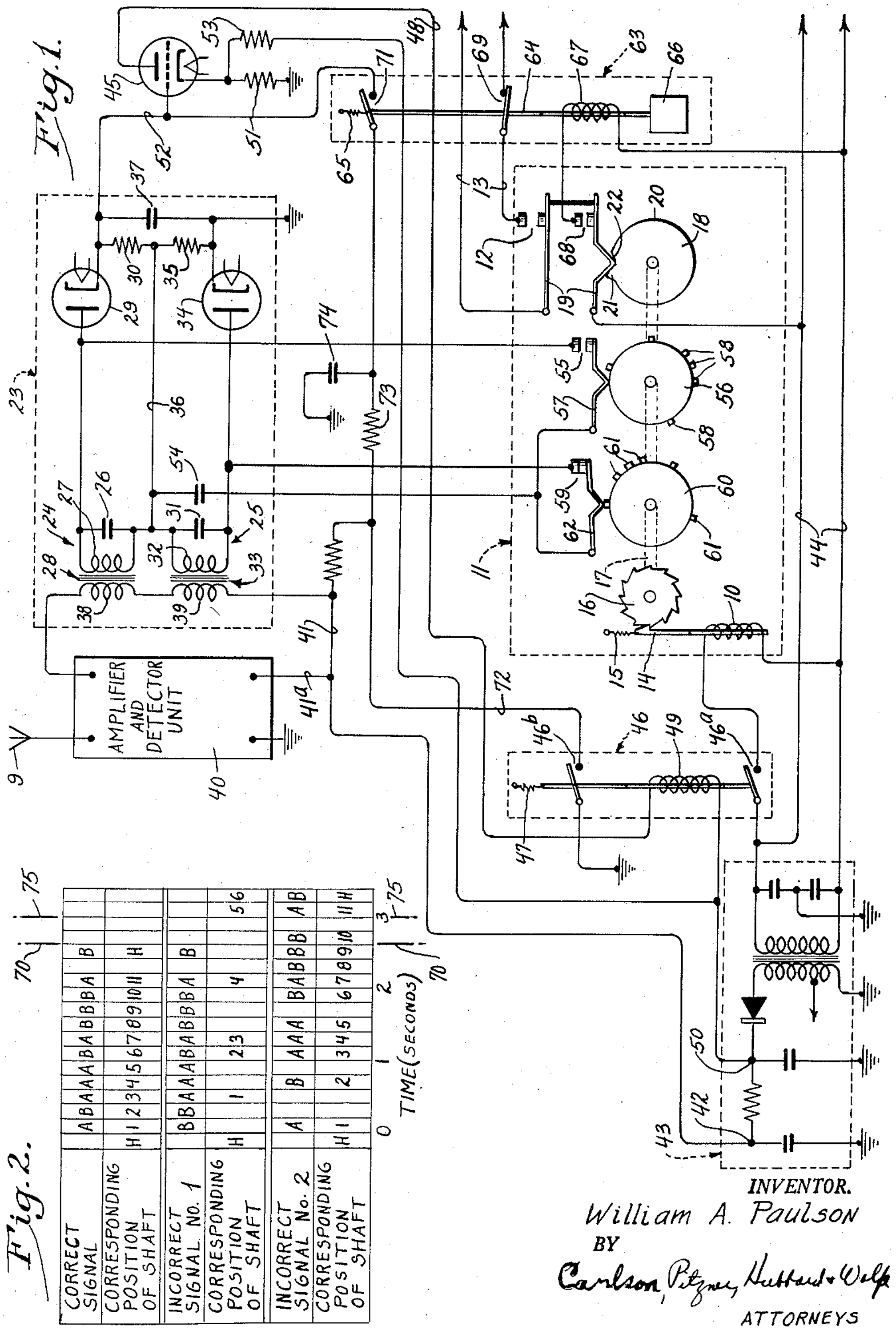
Figure 1 is a circuit diagram of a receiver embodying the novel features of the present invention.
Fig. 2 is a table showing different positions of the stepping mechanism corresponding to different input signals.

The invention is shown in the drawings for purposes of illustration embodied in a radio receiver which is adapted to perform a control function such as actuation of a power driven garage door operator (not shown) selectively in response to a signal transmitted from a remote point and comprising a code combination of pulses of different frequencies A and B following one another in a preselected order and occurring within a predetermined time interval. A correct code combination for obtaining response by the receiver, for example, may be made up of eleven pulses arranged in the following order as shown in Fig. 2: A B A A A B A B B B A. In the present instance, the code frequencies B and A respectively are audio frequencies such as 700 cycles per second and 1200 cycles per second and the code pulses of these frequencies are transmitted to the receiver over a carrier wave having a frequency on the order of 27 megacycles.

Signals transmitted to the receiver are picked up by a suitable antenna 9 and, where the code pulses modulate a carrier wave as in the present instance, pass through an amplifier and detector unit 40 of well known construction adapted to demodulate the carrier and obtain the pulses of the code frequencies A and B. These pulses then are applied to a discriminator 23 which is sensitive selectively to one or the other of the code frequencies and which, upon receipt of each pulse of one of the code frequencies occurring in its proper position in the code combination, supplies an impulse suitable for effecting advance of a movable element 17 of a stepping unit 11. The number of steps of the element between a home position shown in Fig. 1 and a load position in which a control switch 12 is closed corresponds to the number of pulses in the code combination, the control switch 12 completing a load circuit through conductors 13 thereby performing the desired control function.

To distinguish between code frequency pulses in the correct order and pulses which are out of order, the stepping unit 11 is utilized to vary the condition of the discriminator 23 in successive steps corresponding to the different positions of the stepping element 17 for advance of the latter from one step to the next only upon receipt of a pulse of the correct frequency. The time for response by the receiver after the stepping element has moved out of its home position is limited by a timing unit 63 which, at the end of an interval long enough for receipt of the correct code combination, initiates operation of resetting mechanism for restoring the receiver to its starting condition without completing the circuit through the control switch 12.

The stepping element 17, in this instance, is a shaft 17 suitably supported for rotation about its axis in the same direction from the home position shown in Fig. 1 and to a stop position through the load position in which the control switch 12 is closed. While only a partial revolution of the shaft may be utilized for a receiving cycle, the shaft rotates through a complete revolution in this instance so that the home position also is the stop position. Advance of the shaft is effected by a motor comprising a ratchet wheel 16 fast on the shaft 17 and a pawl 14 normally urged into a retracted position by a spring 15 but advanced into engagement with the pawl teeth to rotate the shaft upon energization of a stepping coil 10, the shaft remaining in each position during retraction of the pawl upon deenergization of the coil. To operate the control switch 12, a pivoted double follower arm 19 carrying a movable contact of the switch rides on the periphery of a cam wheel 18 which is fast on the shaft and presents to the follower arm a recess 22 in the home position and a dwell surface 20 in the next ten positions for holding the switch open and a rise 21 in the eleventh or load position for closing the switch. With the load position of the stepping shaft 17 eleven steps away from the home position, it will be apparent that each position of the shaft corresponds to a different one of the pulses of the preselected code combination.

In accordance with one aspect of the invention, the condition of the discriminator 23 for selective response to one or the other of the code frequencies A and B is correlated with the position of the stepping shaft 17 to provide an impulse for effecting advance of the shaft from each of its positions only upon receipt of a pulse of the particular code frequency which corresponds to that shaft position. This is accomplished by constructing the discriminator in a novel manner for selective variation of its sensitivity to the different code frequencies and by utilizing the stepping unit 11 for effecting such variation. The discriminator thus comprises at least one turned circuit 24 operable to pass current at its resonant frequency suitable for controlling energization of the stepping coil 10 and adapted to be tuned to one or the other of the code frequencies A and B as an incident to advance of the stepping shaft 17.

In this instance, the discriminator 23 comprises two resonant circuits 24 and 25, a first one formed by a capacitor 26 and a secondary 27 of a transformer 28 connected in parallel with each other and in series in a circuit through a diode rectifier 29, an output resistor 30 and a conductor 36. The second resonant circuit 25 similarly comprises a capacitor 31 and a secondary 32 of a transformer 33 connected in parallel with each other and in series in circuit through a diode 34, a second output resistor 35, and the conductor 36. With the diodes polarized to pass current in the same direction through the common conductor 36, the output signal of the discriminator is equal to the algebraic sum of the voltage drops across the resistors, a smoothing capacitor 37 being connected in parallel with the resistors. Herein, the diodes are polarized to charge the side of the capacitor adjacent the first resonant circuit 24 positively when this circuit is passing current and negatively when the second resonant circuit 25 is passing current. To apply the code pulses to the discriminator, primary windings 38 and 39 of the transformers are connected in series between an output terminal of the amplifier and detector unit 40 and a conductor 41 extending to a positive terminal 42 of a direct current power supply unit 43. The latter supplies power to the amplifier and detector unit 40 through a conductor 41[a] and is connected by supply lines 44 to a suitable alternating current source (not shown).

The output of the discriminator 23 appearing across the capacitor 37 is utilized to control the stepping coil 10 through the medium of an electronic switch 45 and a pilot relay 46. Normally open contacts 46[a] of the latter are connected in series with the stepping coil between the supply lines 44 for energization of the coil when the relay pulls in, the relay having a spring 47 for retracting its armature and opening the contacts when the relay coil 10 is deenergized. Herein, the electronic switch 45 is a three electrode vacuum tube with its load circuit extending from the plate of the tube through a conductor 48 and the relay coil 49 to a second positive terminal 50 of the power unit 43, through the latter to ground, and from ground to the cathode through a self-biasing resistor 51. To render the tube 45 conductive for pull-in of the relay 46 in response to signals of the discriminator 23, the grid of the tube is connected by a conductor 52 to the first resonant circuit side of the output capacitor 37 and the other side of the capacitor is connected to ground thereby completing a grid bias control circuit to the cathode through the bias resistor.

With the above arrangement, plate current flow through the bias resistor 51 tends to drive the control grid of the tube negatively with respect to the cathode to maintain the value of the plate current below that required for pull-in of the pilot relay 46. Such bias is overcome by positive potential applied to the grid through the conductor 52 when the current passed by the first tuned circuit 24 is sufficiently greater than that passed by the second tuned circuit 25. Herein, the negative bias on the grid preferably is increased for sharper cut-off of the tube by an auxiliary bias resistor 53 connected between the second output terminal 50 of the power unit 43 and the cathode terminal of the main bias resistor 51 thereby completing another circuit through the main resistor.

To vary the tuning of the first resonant circuit 24, a reactance element, herein a capacitor 54 is connected across the transformer secondary 27 and the capacitor 26 of the first resonant circuit in series with the switch 55 which is actuated by a cam 56 fast on the stepping shaft 17 and shaped to correspond to the code sequence. In this instance, the first resonant circuit is tuned to the high signal frequency when the switch 55 is open and, when the switch is closed to connect the capacitor 54 in parallel with the circuit, is tuned to the lower signal frequency. The switch includes a movable contact on a pivoted follower arm 57 engageable with and shiftable by the cam which comprises a wheel having lugs 58 providing cam rises and secured detachably in a suitable manner around its periphery in different positions corresponding to the steps of the shaft. Herein, the rises are located in the first, fifth, seventh, eighth and ninth positions of the shaft beyond the home position to correspond to the pulses of the low frequency B occurring in the same order in the code combination as shown in Fig. 2.

The same tuning capacitor 54 is utilized to vary the resonant frequency of the second resonant circuit 25. For this purpose, the capacitor is connected across the second circuit in series with a switch 59 which is actuated by another cam wheel 60 fast on the shaft 17. Rises 61 spaced around the periphery of this wheel engage a pivoted follower arm 62 for closure of the second switch in the positions of the stepping shaft in which the first switch 55 is open.

Assuming the stepping shaft 17 is in its home position as shown in Figure 1, the first tuning switch 55 is open so that the first resonant circuit 24 is tuned to passed pulses of the high signal frequency, the second tuning switch 59 is closed to connect the tuning capacitor 54 in parallel with the second resonant circuit 25 to tune the latter to the lower frequency, and the load switch 12 is open. Until pulses of the code frequencies are transmitted to the receiver, the grid of the tube 45 is maintained at a negative potential relative to the cathode and the plate current is insufficient to overcome the relay spring 47 for pull in of the pilot relay 46. Should components of stray signals at frequencies near the signal frequencies be applied to the transformer primaries 38 and 39 at the input of the discriminator 23, some current may pass through the first resonant circuit 24 and produce a drop across the first resistor 30 tending to apply positive bias to the grid through the conductor 52. However, due to the presence of the second resonant circuit 25 and the polarity of its diode 34, the potential drop across the second resistor 35 resulting from current passed by the second resonant circuit opposes that of the first resistor and tends to maintain the tube in a nonconductive condition.

Upon receipt of a pulse of the high frequency A when the stepping shaft 17 is in the home position, this pulse is blocked by the second resonant circuit 25 but is passed by the first circuit 24 to bias the grid positively. The tube 45 then conducts for pull-in of the pilot relay 46 and closure of its contacts 46[a] to complete the energizing circuit for the stepping coil 10. This results in advance of the pawl 14 and rotation of the shaft 17 counterclockwise as viewed in Fig. 1 and one step to its first position from the home position as indicated in Fig. 2. In this position, the follower arm 62 of the second tuning switch 59 is disposed on a dwell surface of the second tuning cam 60 to open the switch and disconnect the tuning capacitor 54 from the second resonant circuit 25 so that the latter is tuned to the high frequency A. In this same position of the shaft 17, the follower arm 57 of the first switch 55 engages a rise 58 to close the switch and connect the capacitor 54 across the first circuit 24 to tune the same to pass pulses of the low frequency B.

At the end of the first pulse of the high frequency A, the tube 45 again is biased to cut-off, the pilot relay 46 drops out, and the stepping coil 10 is deenergized permitting the pawl 14 to shift to its retracted position. Should the first high frequency pulse persist after the stepping shaft has advanced its first step, this pulse will be blocked by the first resonant circuit 24 and the second circuit 25, now tuned to the high frequency A, will pass current to apply a negative bias to the tube to reduce its plate current for drop-out of the pilot relay.

With the stepping shaft 17 in its first position, the discriminator 23 is conditioned to bias the grid positively for conduction by the tube 45 in response to a pulse of the low frequency B. Should the next pulse be of the high frequency A instead of the low frequency B, the second resonant circuit 25, rather than the first circuit 24, will pass current to maintain a negative bias on the grid. Similar selectivity between correct and incorrect pulses is obtained in each position of the stepping shaft. Thus, upon advance of the latter after receipt of each correct pulse, the discriminator is conditioned to effect energization of the stepping coil 10 only in response to the next correct pulse. Upon receipt of a pulse of the wrong signal frequency, the discriminator 23 not only fails to render the tube 45 conductive but actually applies a negative bias to insure cut-off.

When the stepping shaft 17 reaches its eleventh or load position, the double follower arm 19 is shifted by the rise 21 on the load cam 18 to close the load switch 12. At this same time, the selecting capacitor 54 is connected across the first resonant circuit 24 by the first switch for advancing the stepping shaft back into its home position in response to a pulse of the low frequency B, the correct pulse train for effecting a complete cycle thus including, in addition to the eleven code pulses, a twelfth pulse of the lower frequency. Upon receipt of this pulse and return of the shaft 17 to its home position, the receiving cycle is completed with the parts in their initial conditions ready for another cycle.

The signal pulses are spaced apart far enough to insure advance of the stepping shaft 17 in response to each correct pulse and return of the actuating pawl 14 to its retracted position before the next correct pulse. For example, the correct signal pulses may occur at the rate of five per second as shown in Fig. 2. The final pulse of the low frequency B for advancing the mechanism to its home position preferably is delayed for a short period such as one-fifth of a second to provide ample time for performance of the control function upon closure of the load switch 12.

To reduce the possibility of response of the receiver to stray or unauthorized pulses of the same character as the code pulses, the present invention, in another aspect, contemplates restoring the stepping shaft 17 to its home position automatically without completing the circuit through the load switch 12 when the stepping shaft 17 is advanced beyond the home position but fails to reach the load position within a preselected time interval at least as long as that of a correct code sequence. This is accomplished by a timing device 63 which is started as an incident to movement of the stepping shaft to its first position and is operable, at the end of the selected time interval, to disable the load switch and render the resetting means effective to restore the stepping shaft.

In this instance, the timing device 63 is a relay having its armature 64 urged by a spring 65 to a retracted position and suitable means such as a dashpot 66 opposing advance of the armature upon energization of the relay coil 67. The latter is deenergized in the home position of the stepping shaft 17 but is energized through a switch 68 which includes a movable contact carried by the double follower arm 19 and spaced closer to the fixed contact than the movable contact of the load switch for closure of the switch 68 to connect the relay coil across the supply lines 44 when the arm engages the dwell surface 20 and the rise 21 on the load cam 18 in all except the home position of the shaft. To disable the load switch 12, a normally closed switch 69 connected in series with the load switch is opened by pull-in of the timing relay 63 at the end of its timed interval. Herein, the interval between energization of the timing relay coil and pull-in of the relay is approximately two and two-fifths seconds and the relay pulls in at a time indicated by a line 70 in Fig. 2 after the final pulse B has been received.

The resetting means for restoring the stepping shaft 17 to its home position comprises the pilot relay 46, the tube 45, and a second bias circuit including a normally open switch 71 for the control grid of the tube. To render this means effective, the switch 71 is closed by pull-in of the timing relay 63 to connect the grid to the first positive terminal 42 of the power unit 43 through the conductor 41 for increasing the plate current of the tube to energize the pilot relay. When the latter pulls in for advance of the stepping mechanism one step, normally open contacts $46^b$ of the relay are closed to complete a circuit connecting the grid to ground through a conductor 72 and the then closed timing relay switch 71 thereby removing the positive bias from the grid for deenergizing the pilot relay. As soon as the latter drops out, its contacts $46^b$ open and the grid is biased conductively again from the power unit to reenergize the relay. Such alternate energization and denergization of the pilot relay continues until the stepping shaft 17 returns to its home position, the rate of stepping being controlled herein by a resistor 73 in series with the timing relay switch 71 and a capacitor 74 connected between the resistor and the ground. When the shaft reaches the home position, the double follower arm 19 enters the recess 22 on the cam 18 to interrupt the energizing circuit for the timing relay and the latter drops out for closure of the load disabling switch 69 and opening of the reset switch 71. The second bias control circuit thus is interrupted to disable the resetting means and the parts are restored to their original conditions ready for a new cycle.

Due to the selective conditioning of the discriminator 23 and the limitation of the response time of the receiver, a train of pulses of the code frequencies A and B occurring in any sequence other than the code sequence or in a time interval longer than that of the timing relay 63 will be ineffectual to complete the circuit through the load switch 12. Assuming that a train of pulses designated as "Incorrect Signal No. 1" in Fig. 2 differs from the correct signal only by having its first pulse of the low frequency B rather than the high frequency A, the stepping shaft 17 will not advance to its first position until the third pulse of the train because the first resonant circuit 24 is tuned to the high frequency and this is the first high frequency pulse of the train. With the stepping shaft in the first position to tune the first resonant circuit 24 to the lower frequency, the mechanism is not advanced to its second position until the next pulse of the low frequency B which is the sixth pulse of the incorrect signal. When the timing relay 63 pulls in as indicated by the line 75 in Fig. 2, the entire incorrect pulse train will have been received, but the stepping shaft will have advanced only to its fourth position from home. The resetting means then advances the shaft to the home position with the disabling switch 71 open so that the load circuit is not completed as the mechanism passes through the load position.

For another example, let it be assumed that a train of pulses designated as "Incorrect Signal No. 2" in Fig. 2 differs from the correct signal only in a delay of several of the pulses so that the interval for the whole train is longer than the period of the timing relay 63. In this case, the stepping shaft 17 will have advanced only nine positions when the timing relay pulls in as indicated by the line 70 to interrupt the circuit through the load switch 12 and to activate the resetting means.

It will be apparent that the novel receiver described above will perform a control function only in response to a train of pulses of the code frequencies A and B occurring in the proper order and within a predetermined time interval. By virtue of the arrangement of the resonant circuits 24 and 25 with the tuning capacitor 54 and its controlling switches 55 and 59, selective response to signal pulses of different frequencies is achieved simply with few parts and with few contacts to adjust and maintain in service use. The pilot relay 46, being interposed between the stepping coil 10 and the tube 45, makes it possible to utilize the latter both for advancing the stepping shaft 17 in response to a correct signal and for restoring the shaft upon receipt of an incorrect signal.

I claim as my invention:

1. In a receiver responsive to a signal comprising a plurality of pulses of different frequencies occurring in a coded sequence, the combination of, a discriminator responsive to signals of said frequencies and having two resonant circuits and an output circuit providing unidirectional output signals of opposite polarities when the respective resonant circuits are passing current, each of said resonant circuits being tuned to the same one of said frequencies, stepping switch mechanism coupled to said discriminator output circuit for actuation of the mechanism and advance of a movable member thereof one step in response to an output signal of one polarity, a reactance element operable when coupled to each of said resonant circuits to tune the same to the other of said frequencies, said switching mechanism controlling connection of said element to said resonant circuits and operating, when actuated in response to a correct one of said pulses, to connect the element to the proper resonant circuit for producing an output signal of said one polarity to actuate the mechanism in response to the next correct pulse, control means responsive to movement of said stepping member a predetermined distance away from a starting position upon receipt by said discriminator of said coded signal, and means controlling said mechanism and operable in response to pulses in a sequence other than said coded sequence to restore said member to said starting position thereof without activating said control means.

2. In a receiver responsive to a signal comprising a plurality of pulses of different frequencies occurring in a coded sequence, the combination of, a discriminator responsive to signals of said predetermined frequencies and having two resonant circuits and an output circuit providing unidirectional output signals of opposite polarities when the respective resonant circuits are passing current, each of said resonant circuits normally being tuned to the same one of said frequencies, stepping switch mechanism coupled to said discriminator output circuit for actuation of the mechanism and advance of a movable member thereof one step in response to an output signal of one polarity, and a reactance element operable when coupled to each of said resonant circuits to tune the same to the other of said frequencies, said switching mechanism controlling connection of said element to said resonant circuits and operating, when actuated in response to a correct one of said pulses, to connect the element to the proper resonant circuit for producing an output signal of said one polarity to actuate the mechanism in response to the next correct pulse.

3. In a receiver responsive to a signal comprising a plurality of pulses of two different frequencies occurring in a coded sequence, the combination of, a discriminator including a resonant circuit normally tuned to one of said frequencies to provide an output signal in response to a pulse of the one frequency, stepping switch mechanism coupled to said discriminator for actuation of the mechanism and advance of a movable member thereof one step in response to said output signal, a reactance element operable when coupled to said resonant circuit to change the tuning thereof and condition the same to supply said output signal in response to a pulse of the other of said frequencies, said switch mechanism controlling the coupling of said element to said resonant circuit and operating, upon each advance of said member in response to an output signal from a pulse of the correct one of said frequencies to change the tuning of the circuit to provide an output signal for advance of the member in response to the next pulse of the correct frequency in the code sequence, control means responsive to movement of said member a predetermined distance away from a starting position upon receipt by said discriminator of said coded signal, and means controlling said mechanism and operable in response to pulses in a sequence other than said predetermined sequence to restore said member to said starting position thereof without activating said control means.

4. In a receiver responsive to a signal comprising a plurality of pulses of two different frequencies occurring in a coded sequence, the combination of, a discriminator including a resonant circuit normally tuned to one of said predetermined frequencies to supply an output signal in response to a pulse of the one frequency, stepping switch mechanism coupled to said discriminator for actuation of the mechanism and advance of a part thereof one step in response to said output signal, a reactance element adapted when coupled to said resonant circuit to change the tuning thereof and condition the same to supply said output signal in response to a pulse of the other of said frequencies, said switching mechanism having contacts controlling the coupling of said element to said resonant circuit and operating, upon each advance of said part in response to an output signal from a pulse of the correct one of said frequencies, to change the tuning of the circuit to supply an output signal for advance of the part in response to the next pulse of the correct frequency in the code sequence.

5. In a receiver responsive to a signal comprising a plurality of pulses of different frequencies occurring in a coded sequence, the combination of, switching mechanism having a part adapted, when the mechanism is energized intermittently, to advance step by step and unidirectionally from a start position to a load position, load control means activated in response to advance of said part to said load position, signal pulse discriminating circuits controlling said switching mechanism and operable to energize the latter for advance of said part one step in response to a signal pulse of one frequency when the circuits are in one tuned condition and in response to a signal pulse of another frequency when the circuits are in another tuned condition, said switching mechanism having a connection with said discriminating circuits to vary the tuned condition of the circuits and operating, upon advance of said part in response to each correct pulse of said coded sequence, to place the circuits in the corresponding one of said tuned conditions to advance the part in response to the next correct pulse of the sequence, resetting means operable, when rendered effective, to energize said mechanism to restore said part to said starting position without activating said load control means, a timing device started as an incident to movement of said part out of said starting position and operable to measure a period long enough to permit advance of the part to said load position in response to said coded sequence of signal pulses, and means controlled by said device and operable at the end of said period to render said resetting means effective.

6. In a receiver responsive to a signal comprising a plurality of pulses arranged in a coded sequence, the combination of, switch mechanism having a part adapted, when the mechanism is energized, to move step by step and unidirectionally from a start position to a stop position through a load position, a pilot relay operable upon each energization thereof to complete an energizing circuit for said mechanism to advance said part one step, an electronic switch normally biased nonconductively and controlling said pilot relay for energization of the latter when the switch passes current, first control means for said switch adapted to bias the same conductively for energization of said pilot relay and advance of said part toward said load position in response to each correct pulse of said coded signal sequence, load control means activated in response to advance of said part into said load position, second control means for said switch including contacts of said pilot relay and operable when rendered effective to bias the switch conductively and energize the pilot relay intermittently for advance of said part to said stop position through said load position, a timing relay adapted when pulled-in to render said second control means effective and to disable said load control means and operable when energized to pull in at the end of a timed interval following such energization, said interval having sufficient length to permit advance of said part to said load position in response to said coded sequence, and an energizing circuit for said timing relay completed as an incident to movement of said part out of said start position and interrupted for drop out of the relay as an incident to movement of the part into said stop position.

7. In a receiver responsive to a signal comprising a plurality of pulses arranged in a coded sequence, the combination of, stepping mechanism having a part adapted, when the mechanism is energized, to move step by step and unidirectionally from a start position to a stop position through a load position, a pilot relay operable upon each energization thereof to complete an energizing circuit for said mechanism to advance said part one step, an electronic switch normally biased nonconductively and controlling said pilot relay for energization of the latter when the switch passes current, first control means for said switch adapted to bias the same conductively for energization of said pilot relay and advance of said part toward said load position in response to each correct pulse of said coded signal sequence, load control means activated in response to advance of said part into said load position, second control means for said switch including contacts of said pilot relay and operable when rendered effective to bias the switch conductively and energize the pilot relay intermittently for advance of said part to said stop position through said load position, time delay means started as an incident to movement of said part out of said start position and operable to time a period long enough for advance of the part to said load position in response to said coded sequence of pulses and, at the end of said period, to disable said load control means and render said second control means effective for advance of said part to said stop position without activating the load control means, and means for disabling said time delay means to restore the apparatus to its original condition in response to advance of said part into said stop position.

References Cited in the file of this patent

UNITED STATES PATENTS

| | | |
|---|---|---|
| 1,655,689 | Chauveau | Jan. 10, 1928 |
| 2,095,688 | Ballentine | Oct. 12, 1937 |
| 2,131,164 | Chauveau | Sept. 27, 1938 |
| 2,394,786 | Korneke | Feb. 12, 1946 |
| 2,437,326 | Lewis | Mar. 9, 1948 |
| 2,497,656 | Clarke | Feb. 14, 1950 |
| 2,563,127 | McGoffin | Aug. 7, 1951 |
| 2,604,518 | Oliver | July 22, 1952 |

FOREIGN PATENTS

| | | |
|---|---|---|
| 151,403 | Australia | May 14, 1953 |